R. E. WAGNER.
WELDING MACHINE.
APPLICATION FILED DEC. 24, 1917.

1,305,039.

Patented May 27, 1919.

Inventor:
Robert E. Wagner,
by Albert G. Davis
His Attorney.

UNITED STATES PATENT OFFICE.

ROBERT E. WAGNER, OF PITTSFIELD, MASSACHUSETTS, ASSIGNOR TO GENERAL ELECTRIC COMPANY, A CORPORATION OF NEW YORK.

WELDING-MACHINE.

1,305,039.   Specification of Letters Patent.   Patented May 27, 1919.

Application filed December 24, 1917. Serial No. 208,554.

*To all whom it may concern:*

Be it known that I, ROBERT E. WAGNER, a citizen of the United States, residing at Pittsfield, county of Berkshire, State of Massachusetts, have invented certain new and useful Improvements in Welding-Machines, of which the following is a specification.

The present invention comprises a novel arc welding machine which is particularly suitable for welding seams or the like, requiring the welding electrode to travel linearly over a considerable distance.

In accordance with my invention, means is provided in the welding machine for effecting the feed of the arcing electrode toward the weld by virtue of the linear displacement of the welding head. In the specific embodiment of my invention shown in the accompanying drawing, the electrode feed is effected by an inclination of a bar supporting the welding electrode.

Figure 1:
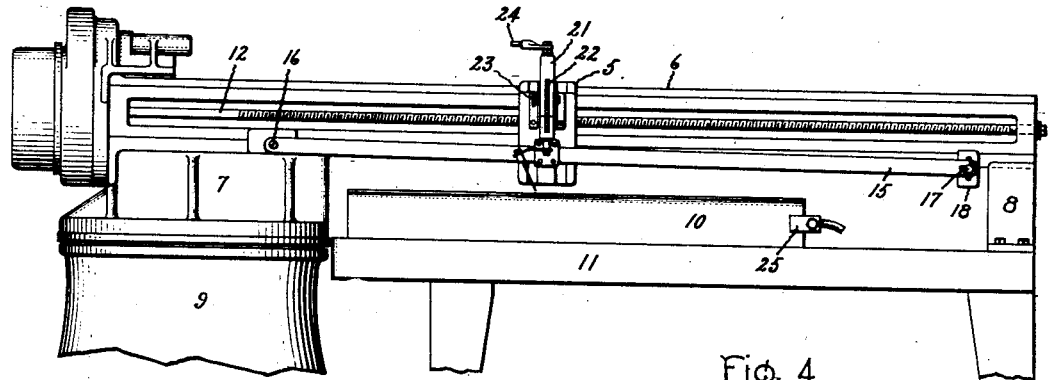
Figure 2:
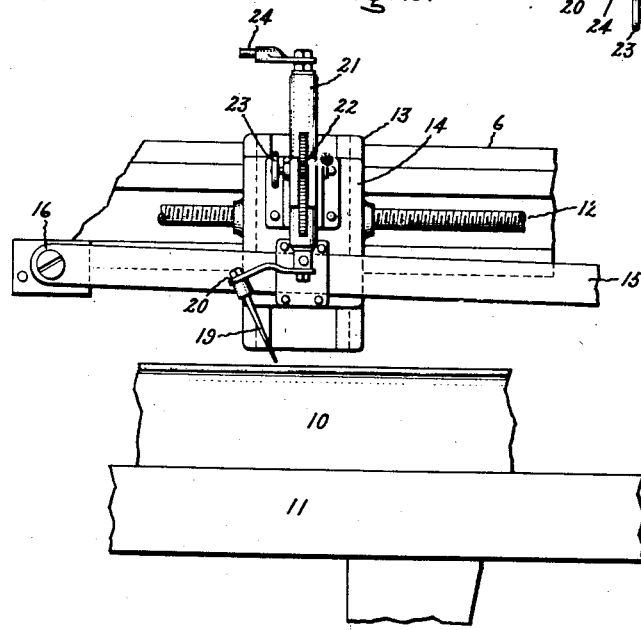
Figure 3:
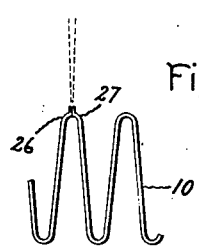

In the accompanying drawings, Figure 1 is a side elevation of a complete machine embodying my invention; Fig. 2 is a side elevation of the welding head on a somewhat larger scale; Fig. 3 is a sectional view of a weld; and Fig. 4 is a detail plan view of the welding head.

The main essentials of the welding machine, as shown in Fig. 1, comprise a welding head 5 movable back and forth upon a frame 6 supported by supports or brackets 7 and 8. The bracket 7 is rotatably mounted upon a pedestal 9, broken away. The work 10, which as shown in Fig. 3 may consist of metal plates to be seam welded, is supported upon a table 11. The welding head 5 is caused to move linearly over the work by the rotation of a lead screw 12 driven by a motor and gear mechanism (not shown) within the casings 3 and 4.

Figure 4:
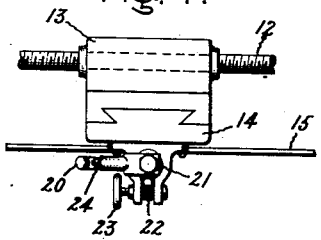

As best shown in Figs. 2 and 4, the welding head comprises two parts, one of which, 13, is threaded and engages with the lead screw 12, and another part, 14, which is movable with respect to the part 13 and is supported by a bar 15. As best shown in Fig. 1 bar 15 is pivotally mounted at 16 upon the pedestal 7. the opposite end being adjustable up and down by means of a screw 17 passing through a slide within a block 18.

The welding electrode 19 is attached by means of a clamp 20 to a holder 21 which is attached to the part 14 of the welding head and is movable up and down by means of a rack and gear 22 operated by a hand-wheel 23. A suitable welding current is applied to the electrode 19 by the conductor 24 connected to the holder 21. The opposite terminal of the electric circuit is connected to the work 10 in any suitable manner, for example, by means of a clamp 25.

When used, for example, for welding of seams in corrugated tanks for transformers or the like, the operation of my improved machine is as follows: The edges of plates 26, 27 to be welded, are clamped in position abutting each other, as shown, for example, in Fig. 3, and the welding head 5 is brought to one end of the work. The electrode is then lowered by the operator by means of the hand-wheel 23 into contact with the work, an arc is started, as by withdrawing the electrode a suitable distance, and the lead screw 12 is caused to rotate. This causes the welding head to slowly progress along the seam to be welded. As the welding head is traversed with respect to the work the part 14 carrying the welding electrode is gradually lowered as it slides upon the inclined bar 15, thereby compensating for electrode consumption and maintaining substantially constant the length of the welding arc. If for any reason the electrode should be consumed a little faster or more slowly than the usual rate the operator, who in any event will be watching the weld, may make a fine adjustment by causing the electrode to be raised or lowered by means of the hand-wheel 23.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. An arc welding machine comprising the combination of a welding head, a welding electrode carried thereby, means for linearly moving said head to produce a weld, and an inclined support for said head for automatically lowering said electrode as the same progresses along the weld.

2. An arc welding machine comprising the combination of a welding head, an arc-supporting electrode carried thereby, means for supporting the work to be welded, a bar on which said welding head rides, means for setting the angular relation of said bar to the work for automatically feeding said electrode as it wastes away.

3. An arc welding machine comprising the combination of means for supporting the work to be welded, a welding head adapted to carry an arc electrode, means for moving said head linearly along said work, and supporting means for said head adapted to be inclined to the work to shorten the distance between said head and the work as the electrode wastes away.

4. An arc welding machine comprising the combination of a welding electrode, means for linearly displacing said electrode along the work and means for feeding said electrode to compensate for the consumption thereof by and in accordance with the linear displacement of said electrode.

In witness whereof, I have hereunto set my hand this 20th day of December, 1917.

ROBERT E. WAGNER.